United States Patent
Goodwin et al.

(10) Patent No.: US 9,341,169 B2
(45) Date of Patent: May 17, 2016

(54) ACOUSTIC DETERMINATION OF PISTON POSITION IN A MODULAR DYNAMICS TESTER DISPLACEMENT PUMP AND METHODS TO PROVIDE ESTIMATES OF FLUID FLOW RATE

(71) Applicant: Schlumberger Technology Corporation, Sugar Land, TX (US)

(72) Inventors: Anthony R. H. Goodwin, Sugar Land, TX (US); Audrey Apoteker, Saint Hilaire des Landes (FR); Sylvain Bedouet, Houston, TX (US); Frederic Jacqueme, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 296 days.

(21) Appl. No.: 13/935,182

(22) Filed: Jul. 3, 2013

(65) Prior Publication Data

US 2015/0007986 A1    Jan. 8, 2015

(51) Int. Cl.
| | | |
|---|---|---|
| F15B 15/28 | (2006.01) | |
| F04B 1/00 | (2006.01) | |
| F04B 47/04 | (2006.01) | |
| F04B 51/00 | (2006.01) | |
| G01S 7/52 | (2006.01) | |
| G01S 15/10 | (2006.01) | |
| G01S 15/88 | (2006.01) | |

(52) U.S. Cl.
CPC . *F04B 1/00* (2013.01); *F04B 47/04* (2013.01); *F04B 51/00* (2013.01); *G01S 7/52006* (2013.01); *G01S 15/10* (2013.01); *G01S 15/88* (2013.01); F04B 2201/0201 (2013.01); F15B 15/2884 (2013.01)

(58) Field of Classification Search
CPC .......... E21B 47/09; F15B 15/14; F15B 15/28
See application file for complete search history.

(56) References Cited

U.S. PATENT DOCUMENTS

| | | | |
|---|---|---|---|
| 4,543,649 A | 9/1985 | Head et al. | |
| 4,938,054 A | 7/1990 | Dye et al. | |
| 5,592,438 A * | 1/1997 | Rorden et al. | 367/83 |
| 6,119,579 A * | 9/2000 | Pawelski | 92/5 R |
| 6,722,261 B1 | 4/2004 | Brown et al. | |
| 7,062,958 B2 | 6/2006 | Diakonov et al. | |
| 7,665,354 B2 | 2/2010 | Shammai | |
| 2009/0114391 A1 | 5/2009 | Smith, IV et al. | |
| 2015/0007647 A1* | 1/2015 | Goodwin et al. | 73/152.23 |

FOREIGN PATENT DOCUMENTS

GB    2377952 A    1/2003

OTHER PUBLICATIONS

International Search Report and the Written Opinion for International Application No. PCT/US2014/044984 dated Oct. 28, 2014.

* cited by examiner

*Primary Examiner* — William P Neuder
(74) *Attorney, Agent, or Firm* — Kenneth L. Kincaid

(57) ABSTRACT

A method for determining a piston position in a downhole tool, having steps of providing a transducer in the downhole tool, wherein the tool has a piston used to create a vacuum for the downhole tool, providing a transducer tone burst to provide acoustic energy toward the piston, reflecting the transducer tone burst by a surface of the piston, receiving the transducer tone burst at a receiver, calculating time of flight for the transducer tone burst and determining the piston position in the downhole tool based upon the calculated time of flight of the transducer tone burst.

18 Claims, 3 Drawing Sheets

ACOUSTIC DETERMINATION OF PISTON POSITION IN A MODULAR DYNAMICS TESTER DISPLACEMENT PUMP AND METHODS TO PROVIDE ESTIMATES OF FLUID FLOW RATE

CROSS-REFERENCE TO RELATED APPLICATIONS

None.

FIELD OF THE INVENTION

Aspects relate to the use of acoustic apparatus in downhole operations. More specifically, aspects relate to acoustic determination of piston position in a modular dynamics tester displacement pump.

BACKGROUND INFORMATION

Modular dynamics testers are used to acquire amounts of reservoir fluid for analysis and transportation. The reservoir fluid is drawn into the modular dynamics tester through a probe that is placed in contact with the bore-hole wall. The placement is accomplished by reducing the pressure within the modular dynamics tester tubular that initially contains bore-hole fluid, from the pressure of the formation.

Pressure reduction used for placing the modular dynamics tester tubular is generated by a positive displacement pump operated by hydraulic fluid. In conventional apparatus and methods, piston position is determined with a transducer that is based on the Hall effect. Such conventional apparatus are used within approximately one (1) centimeter of the end cap and provide methods of determining the position as a function of the whole piston movement.

Four (4) effects may be accomplished, including (1) reduction of pressure surges as the piston meets the cylinder end; (2) control of the pump speed to provide pressure control essentially eliminating the reduction of pressure surges as the piston meets the cylinder end; (3) from knowledge of the thermophysical properties of the hydraulic oil, the hydraulic fluid flow rate may be calculated; and (4) from the hydraulic fluid flow rate combined with either calculated or measured thermophysical properties of the reservoir fluid, an estimate may be provided of the flow-rate of the reservoir fluid within the flow-line tubular.

Conventional systems and methods do not accurately determine the position of a piston surface and therefore the inherent problems of pressure surges and improper pump speeds pervade the operations of these systems.

SUMMARY

In one non-limiting embodiment, a method for determining a piston position in a downhole tool is disclosed comprising providing a transducer in the downhole tool, wherein the tool has a piston used to create a vacuum for the downhole tool, providing a transducer tone burst to provide acoustic energy toward the piston, reflecting the transducer tone burst by a surface of the piston, receiving the transducer tone burst at a receiver; calculating time of flight for the transducer tone burst, determining the piston position in the downhole tool based upon the calculated time of flight of the transducer tone burst.

In another non-limiting embodiment, a system for determining a position of a piston, comprising: a cylinder; a cylinder head attached to one end of the cylinder; a piston placed within the cylinder, the piston movable between a first top position to a second bottom piston, wherein the cylinder, the cylinder head and the piston define a volume, and a transducer and associated electronics positioned adjacent to the cylinder wherein the transducer is configured to produce a transducer tone burst of acoustic energy, wherein the transducer and associated electronics are configured to calculate a position of the piston in the volume through time of flight calculations.

DETAILED DESCRIPTION

There are numerous methods that may be used to determine the position of the piston within the cylinder and these include, but are not limited to, the following: (1) a Linear Variable Displacement Transducer (LVDT) as provided by a rod moving within a toroidal magnet, (2) a magnet positioned outside the cylinder moving in response to the piston position and detected with a method analogous to item 1, and (3), acoustic methods.

Figure 2:
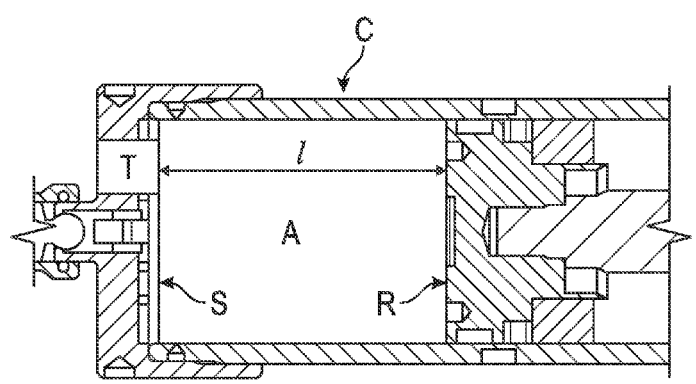
FIG. 2 is an expanded view of the right side of FIG. 1 showing a cross section through a displacement pump used to move reservoir and bore-hole fluid with a hydraulic fluid, wherein an acoustic transducer T is positioned.
Figure 3:
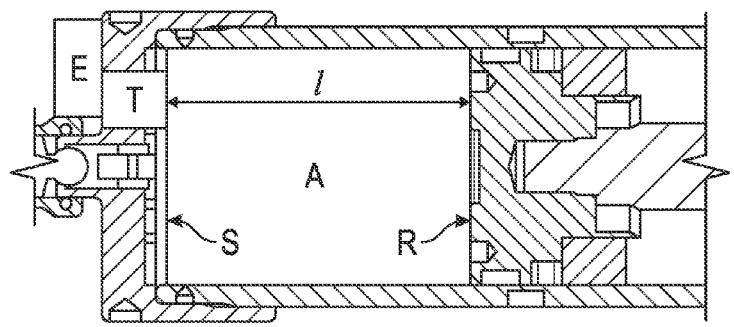
FIG. 3 is an expanded view of the cross-section provided in FIG. 2 including an electronics module used to determine distances.

Aspects described utilize acoustic methods provided above in item three (3). Particularly, measurement of the time-of-flight of a pulse of sound as provided in FIGS. 2 and 3 is used. An acoustic transducer T is located either flush with the cylinder end or incorporated into a screen S as provided in FIGS. 2 and 3. The sound emitted as a pulse by an acoustic transducer T is reflected by the acoustic impedance mismatch at the surface R, which is parallel with the transducer T, and travels a distance 2l before arrival at the transducer T that is now acting as a receiver. The surface R is on a piston that is parallel with the surface of the transducer T and moves within the cylinder C. From knowledge of the speed of sound μ, of sufficient certainty for the purpose intended, in the fluid through which the sound traverses, the length l can be determined from:

$$l = \frac{\mu t}{2} \qquad \text{Equation 1}$$

The measurement of l relies on a single piezoelectric transducer, which is used as both the source and detector of ultrasonic pulses. The transducer T is placed in front of plane parallel reflector. In practice, the transducer T is energized with a suitable tone burst to emit ultrasonic pulses from the surface. The pulse travels through the fluid to the corresponding reflector R and then returns to the transducer T which, now operating as a receiver, detects the arrival. The path length travelled by the pulse is twice the distance separating the source and reflector l and occurs in a transit time t. FIG. 3 shows an alternative position of the electronics required to provide l and communicate the data with other electronics within the formation tester.

Corrections to Equation 1 for the effects of diffraction may be significant under some circumstances and these include the presence of temperature variations and to a lesser extent pressure, which gives rise to variations of acoustic impedance and thus result in diffraction. In the non-limiting embodiment, these variations are estimated to be negligible provided the pump is thermally connected with the bore-hole fluid.

The speed for sound required in Equation 1 can be determined by two methods: (A) from a correlation of independent measurements of the speed of sound in the fluid and (B) from in situ measurement of the speed of sound of the fluid contained in the hydraulic mechanism of the pump. Each of these two methods will be described below.

For a correlation of independent measurements of the speed of sound in the fluid, the speed of sound is a function of both temperature and pressure for Univis J26, which is typically used as the hydraulic fluid within reservoir fluid formation testers, has been determined from time of flight measurements at temperatures between 20 degrees C. and 150 degrees C. and pressure below 68 MPa with an uncertainty of about plus or minus 0.5%. The path length of the apparatus used to determine the speed of sound was determined from measurements of the time of flight in water for which the speed of sound is known with an uncertainty of about plus or minus 0.1% at the conditions of interest. The results were fit within the experimental uncertainty, by the polynomial in Equation 2 below:

$$\frac{u(t, p)}{ms^{-1}} = 1449.2 + 0.0103\left(\frac{p}{MPa}\right)\left(\frac{t}{°C.}\right) + 3.8002\left(\frac{p}{MPa}\right) - 2.8661\left(\frac{t}{°C.}\right)$$

Thus, l can be determined for Univis J26 with an uncertainty of less than plus or minus 1.5% from a combination of measurements of t with Equation 2. For other hydraulic fluids, an alternative correlation of measured sound speeds would be required.

Knowledge of the piston position provides an opportunity to operate the pump in modes hitherto unavailable and these include the following: (1) reduction of pressure surges as the piston meets the stop (surface R is at T and l→0, (2) control the pump speed to provide pressure control; (3) from knowledge of the thermophysical properties of the hydraulic oil provide the hydraulic fluid flow rate assuming either a model for the piston friction that might include equal to 0; and (4), from item 3 combined with either calculated or measured thermophysical properties of the reservoir fluid provide an estimate of the flow rate of the reservoir fluid within the flow-line tubular. Item 4 can be obtained, for example, from a combination of measurements of density and viscosity as a function of temperature and pressure within the flow-line tubular falling below that of a phase transition pressure that include (s+l) and (l+g) as occur in asphaltene precipitation and either dew or bubble pressure, respectively.

The transducer tone burst can be at, for example, a frequency of about 4 MHz. The exact frequency can be varied to maintain an optimal maximum amplitude that ensures propagation through the fluid, reflection and detection. The time for which the burst is produced can be varied to accommodate the rate of change of distance with respect to time and is on the order of 10 µs. The frequency may also be varied through successive bursts and the results between the differing bursts may be checked against one another.

Figure 1:
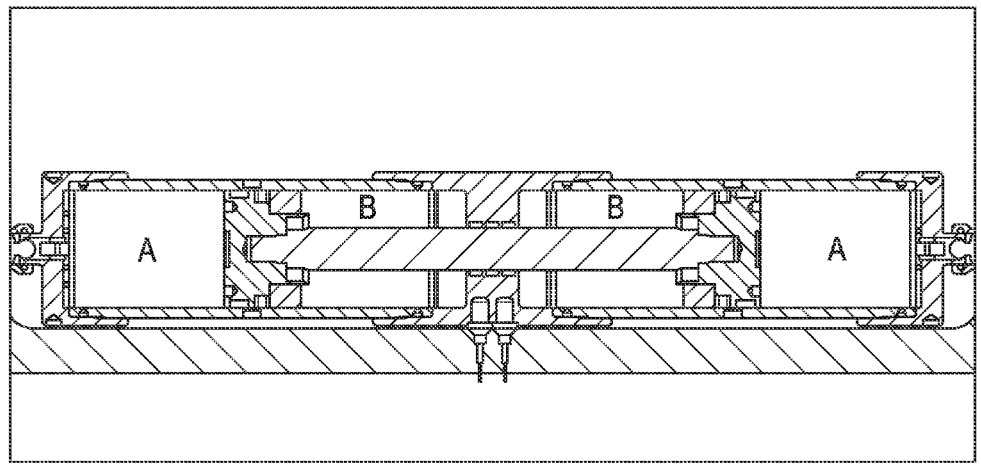
FIG. 1 is a cross section through a displacement pump used in a modular dynamics tester.
Figure 4:
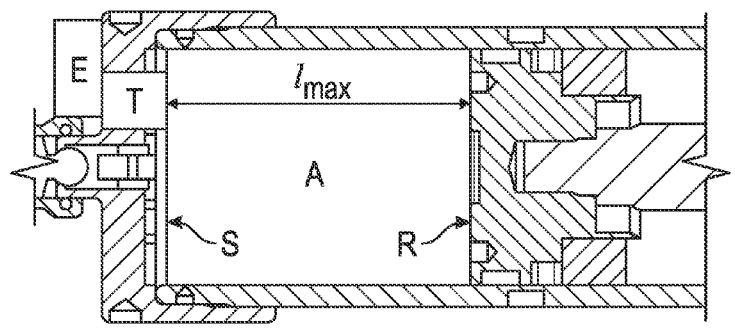
FIG. 4 is an arrangement measuring the maximum distance l using speed of sound when the piston surface R is located at the maximum distance $l_{max}$.
Figure 5:
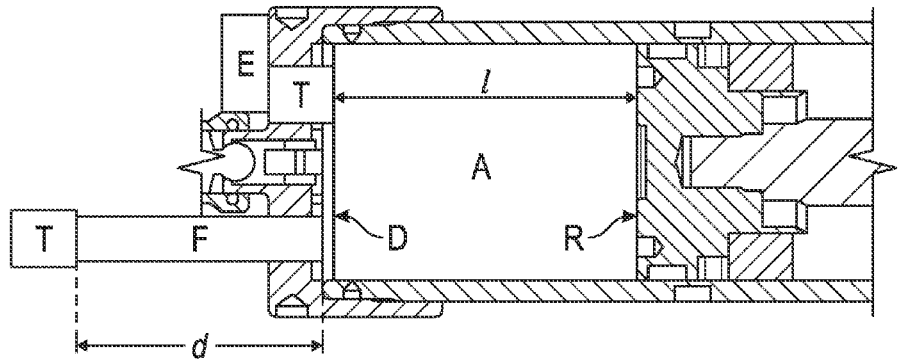
FIG. 5 is a cross-section of a hydraulic fluid chamber of a formation tester positive displacement pump wherein a separate cylindrical chamber F is filled with hydraulic fluid through tube D and the speed of sound is determined from measurement of t over a known length.

Item B uses in-situ measurement of speed of sound of the fluid contained in the hydraulic mechanism that can be achieved by several methods that include at least the following: (1) the same transducer when the piston is located at a known length from the transducer T, for example, the maximum distance $l_{max}$ as shown in FIG. 4; or (2) by the addition of a cavity either attached to or near the hydraulic fluid chamber A of FIGS. 1, 2 and 3 as illustrated for one plausible orientation in FIG. 5 or (3) a measurement of the sound speed, for example, provided by a clamp on Doppler flow meter attached to a tube within the formation tester that supplies hydraulic fluid to the displacement pump. Item 3 is not illustrated, but can be arranged to provide both a measure of flow-rate and speed of sound in the fluid. Item 1 requires the determination of $l_{max}$ when the chamber A is filled with water.

Figure 6:
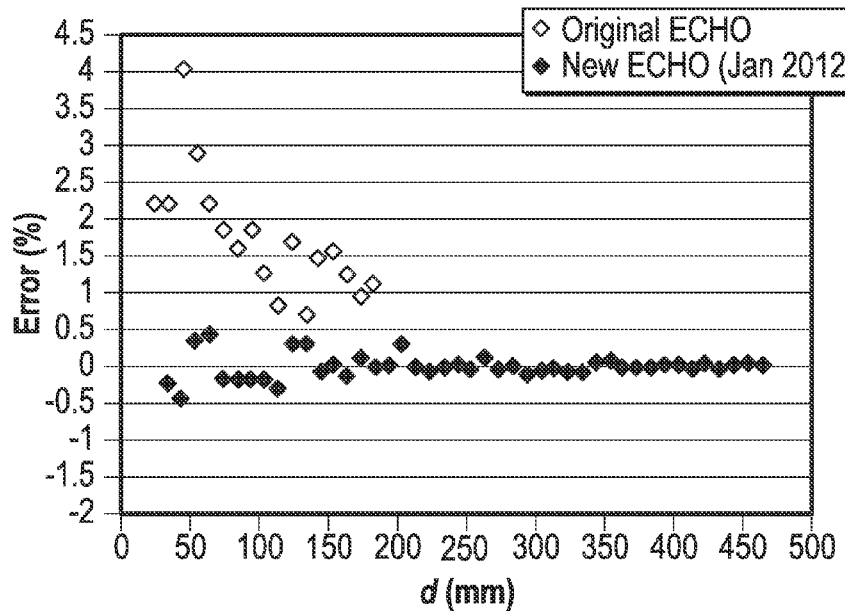
FIG. 6 is a graph showing a fractional difference $\Delta l/l$ as a function of distance l.

To demonstrate the accuracy of the determination of piston position time-of-flight measurements to determine the distance between the transducer and a moving piston, a pseudo displacement unit fabricated from translucent plastic was provided and actual measurements were compared with those obtained with the speed of sound. In this experiment, the time of flight of a sound pulse was combined with the speed of sound in J26 at ambient pressure of about 0.1 MPa and temperature of about 24 degrees C. The distances obtained from time of flight measurements are shown in FIG. 6 as relative differences from those determined with a ruler placed along the cylinder wall. The fractional differences $\Delta l/l$ so determined vary from about 1% at l>0.1 m to 4% at l=0.03 m. The larger than expected difference arises from reading the distance travelled with a ruler owing to the effect of no parallax. The largest contribution to the error arises from the scale and contributes an absolute uncertainty of about 1 mm. This provides a greater contribution to the uncertainty $\sigma l/l$ as l decreases, for example for l=22 mm and $\sigma l$=1 mm $10^2$ $\sigma l/l=5$% that is consistent with the result shown in FIG. 6. The modular dynamics tester displacement unit currently uses two measurements of the location of the piston, one at each end cap. These are used, with software, to estimate the flow rate. This results, as shown in FIG. 6, in a decreased measurement capability at l<0.08 m.

Figure 7:
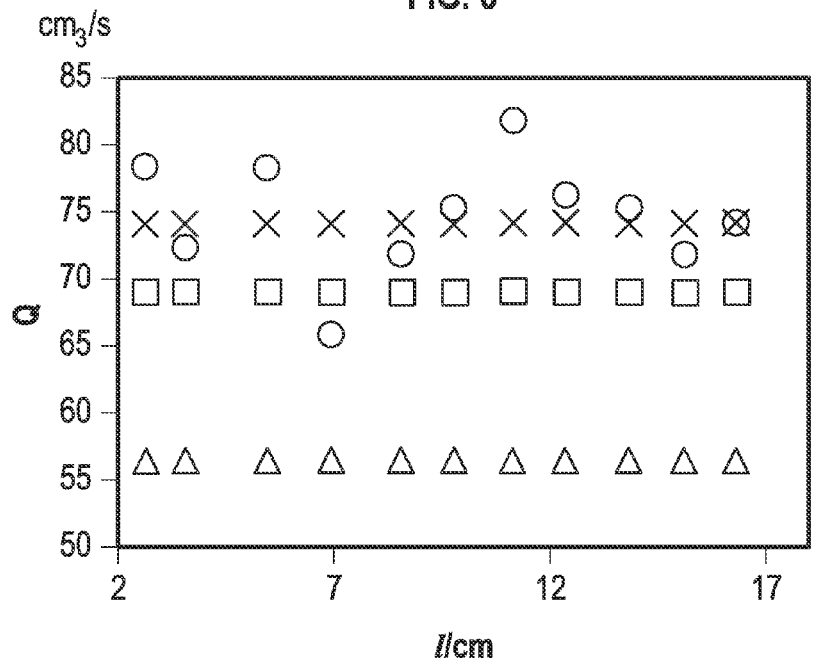
FIG. 7 is a graph of flow rates Q as a function of separation between the transducer and piston d for a displacement pump operated at 2000 revolutions per minute.

The flow rate of the hydraulic fluid can be determined from measurements of the position with the ultrasonic transducers as cited in item 3 of the above list. Experiments have been performed to confirm the expected results. The sound attenuation in J26 arising from the viscosity, which for J26 is at least an order of magnitude greater than of water, attenuates the sound sufficiently to prevent the first iteration of the transducer software to operate. In this case, the measurements were performed by recording the oscilloscope screen as a function of time from which the time of flight was determined with an uncertainty of about plus or minus 2 µs that is about a factor of 10 greater than can be achieved otherwise. The displacement pump was operated at a constant rotation of about 2000 rpm at a hydraulic fluid pressure of 182 psi and temperature of 40 degrees C. The flow rate Q obtained from the measured time of flight are shown in FIG. 7. FIG. 7 also shows the Q obtained from a flow meter with an uncertainty cited by the supplier of about plus or minus 2 percent that lie about 10 percent below those obtained with the acoustic measurement. The method used to obtain the time of flight introduced a standard uncertainty of about plus or minus 2 μs that gives rise to an estimated relative uncertainty in the fluid flow rate (Q'−Q) given by $$10^2 \frac{(Q'-Q)}{Q} = \frac{10(t'-t)\mu}{2d} = \pm 8.9\% \qquad \text{Equation 3}$$

In Equation 3, Q is the flow-rate obtained from the oscilloscope for a measured time t and Q' is the flow-rate determined from t'=t+2 μs and d is the distance between the piston and the transducer which in this case was 17 cm. The speed of sound was assumed to be 1339.8 m s$^{-1}$. The expanded relative uncertainty ΔQ/Q=20% and is equivalent to the variations shown in FIG. 7, was obtained from the time of flight measurements at the extremities of the piston position within the cylinder a principle that is similar to the location of the Hall-effect transducer used by the MDT software. Indeed these differences also encompass the Q obtained from the independent flow-meter. FIG. 7 also shows the Q obtained from the MDT software that relies on measurements of the piston position within 2 cm of the cylinders end-cap. Not surprisingly, the results lie about 20 cm$^3$ s$^{-1}$ below the Q obtained from measurements of the time of flight.

The results suggest a standard relative uncertainty in the determination of the transit time of 0.2 μs would result in a standard relative uncertainty in the determination of flow-rate of the hydraulic fluid Q of about 1 percent. The proposed uncertainty in t can be achieved with relative ease because time can be measured with a relative uncertainty of <10$^{-10}$.

In one example embodiment, a method for determining a piston position in a downhole tool is disclosed comprising providing a transducer in the downhole tool, wherein the tool has a piston used to create a vacuum for the downhole tool, providing a transducer tone burst to provide acoustic energy toward the piston, reflecting the transducer tone burst by a surface of the piston, receiving the transducer tone burst at a receiver, calculating time of flight for the transducer tone burst and determining the piston position in the downhole tool based upon the calculated time of flight of the transducer tone burst.

In another embodiment, the method is accomplished wherein the transducer tone burst is at a frequency of 4 MHz.

In another embodiment, the method may be accomplished wherein the pump is a positive displacement pump.

In another embodiment, the method may further comprise receiving the transducer tone burst at the receiver is performed at the transducer.

In another embodiment, the method may further comprise controlling a speed of a pump associated with the piston.

In another embodiment, the method may further comprise estimating a flow rate of a reservoir fluid.

In another embodiment, the method is accomplished wherein the providing the transducer tone burst of acoustic energy toward the surface of the piston is accomplished through a fluid.

In another embodiment, the method is accomplished wherein the fluid is a downhole fluid.

In another embodiment, the method is accomplished wherein the calculating the time of flight for the transducer tone burst is performed through a correlation of an independent measurement of the speed of sound in a fluid.

In another embodiment, the method is accomplished wherein the calculating the time of flight for the transducer tone burst is performed through an in situ measurement of the speed of sound of fluid contained in a hydraulic mechanism of a pump.

In another embodiment, a system for determining a position of a piston, is disclosed comprising: a cylinder, a cylinder head attached to one end of the cylinder, a piston placed within the cylinder, the piston movable between a first top position to a second bottom piston, wherein the cylinder, the cylinder head and the piston defining a volume, and a transducer and associated electronics positioned adjacent to the cylinder wherein the transducer is configured to produce a transducer tone burst of acoustic energy, wherein the transducer and associated electronics are configured to calculate a position of the piston in the volume through time of flight calculations.

In another embodiment, the system may further comprise a pump speed controller, wherein the pump speed controller is controlled through actuation of the associated electronics.

In another embodiment, an article of manufacture is provided wherein a computer readable medium that is adapted to perform a method of determining a piston position, the computer readable medium adapted to be used in conjunction with a nonvolatile memory such that the computer may execute the method comprising: providing a transducer in the downhole tool, wherein the tool has a piston used to create a vacuum for the downhole tool, providing a transducer tone burst of acoustic energy toward a surface of the piston, reflecting the transducer tone burst by the surface of the piston, receiving the transducer tone burst at a receiver, calculating time of flight for the transducer tone burst, and determining the piston position in the downhole tool based upon the calculated time of flight of the transducer tone burst.

In another embodiment, the article of manufacture is constructed wherein the method performed produces a transducer tone burst at a frequency of 4 MHz.

In another embodiment, the article of manufacture is constructed wherein the method performed pertains to a tool that has a positive displacement pump.

In another embodiment, the article of manufacture is constructed wherein the method performed including receiving the transducer tone burst at the receiver is performed at the transducer.

In another embodiment, the article of manufacture is constructed wherein the method performed further comprises controlling a speed of a pump associated with the piston.

In another embodiment, the article of manufacture is constructed T wherein the method performed further comprises estimating a flow rate of a reservoir fluid.

In another embodiment, the article of manufacture is constructed wherein the providing the transducer tone burst of acoustic energy toward the surface of the piston is accomplished through a fluid.

While the aspects has been described with respect to a limited number of embodiments, those skilled in the art, having benefit of this disclosure, will appreciate that other embodiments can be devised which do not depart from the scope of the disclosure herein.

What is claimed is:

1. A method for determining a piston position in a positive displacement pump of a downhole tool, comprising:
   providing a transducer in the downhole tool, wherein the positive displacement pump has a piston used to create a vacuum for the downhole tool;
   contacting a surface of the piston with a fluid disposed within a fluid chamber of the positive displacement pump;

providing a transducer tone burst of acoustic energy across the fluid chamber and toward the surface of the piston;
reflecting the transducer tone burst by the surface of the piston;
receiving the transducer tone burst at a receiver;
calculating time of flight for the transducer tone burst; and
determining the piston position in the positive displacement pump based upon the calculated time of flight of the transducer tone burst.

2. The method according the claim 1, wherein the transducer tone burst is at a frequency of 4 MHz.

3. The method according to claim 1, wherein the receiving the transducer tone burst at the receiver is performed at the transducer.

4. The method according to claim 1, further comprising: controlling a speed of the positive displacement pump associated with the piston.

5. The method according to claim 1, further comprising: estimating a flow rate of a reservoir fluid.

6. The method according to claim 1, wherein the providing the transducer tone burst of acoustic energy toward the surface of the piston is accomplished through a fluid.

7. The method according to claim 6, wherein the fluid is a downhole fluid.

8. The method according to claim 1, wherein the calculating the time of flight for the transducer tone burst is performed through a correlation of an independent measurement of the speed of sound in a fluid obtained in an apparatus separate from the downhole tool.

9. The method according to claim 1, wherein the calculating the time of flight for the transducer tone burst is performed through an in situ measurement of the speed of sound of fluid contained in a hydraulic mechanism of the positive displacement pump.

10. A system for determining a position of a piston in a positive displacement pump of a downhole tool, comprising:
a cylinder configured to contain a fluid pumped by the positive displacement pump;
a cylinder head attached to one end of the cylinder;
a piston placed within the cylinder, the piston movable between a first top position to a second bottom position, wherein the cylinder, the cylinder head and the piston define a volume; and
a transducer and associated electronics positioned adjacent to the cylinder wherein the transducer is configured to produce a transducer tone burst of acoustic energy across the cylinder and toward a surface of the piston, wherein the transducer and associated electronics are configured to calculate a position of the piston in the volume through time of flight calculations.

11. The system according to claim 10, further comprising:
a pump speed controller, wherein the pump speed controller is controlled through actuation of the associated electronics.

12. An article of manufacture, comprising:
a computer readable medium that is adapted to perform a method of determining a piston position in a positive displacement pump of a downhole tool, the computer readable medium adapted to be used in conjunction with a nonvolatile memory such that the computer may execute the method comprising:
providing a transducer in the downhole tool, wherein the positive displacement pump has a piston used to create a vacuum for the downhole tool;
providing a transducer tone burst of acoustic energy across a fluid chamber of the positive displacement pump and toward a surface of the piston;
reflecting the transducer tone burst by the surface of the piston;
receiving the transducer tone burst at a receiver;
calculating time of flight for the transducer tone burst; and
determining the piston position in the positive displacement pump based upon the calculated time of flight of the transducer tone burst.

13. The article of manufacture according the claim 12, wherein the method performed produces a transducer tone burst at a frequency of 4 MHz.

14. The article of manufacture according to claim 12, wherein the method performed including receiving the transducer tone burst at the receiver is performed at the transducer.

15. The article of manufacture according to claim 12, wherein the method performed further comprises controlling a speed of the positive displacement pump associated with the piston.

16. The article of manufacture according to claim 12, wherein the method performed further comprises estimating a flow rate of a reservoir fluid.

17. The article of manufacture according to claim 12, wherein the providing the transducer tone burst of acoustic energy toward the surface of the piston is accomplished through a fluid.

18. The article of manufacture according the claim 12, wherein the method performed further comprises contacting the surface of the piston with a fluid disposed within the fluid chamber.

* * * * *